US011196149B2

(12) United States Patent
Li et al.

(10) Patent No.: US 11,196,149 B2
(45) Date of Patent: Dec. 7, 2021

(54) WEARABLE APPARATUS AND ANTENNA CONTROL METHOD THEREOF

(71) Applicant: Goertek Inc., Weifang (CN)

(72) Inventors: Yan Li, Weifang (CN); Xinghui Jin, Weifang (CN); Yuge Zhu, Weifang (CN)

(73) Assignee: GOERTEK INC., Weifang (CN)

( * ) Notice: Subject to any disclaimer, the term of this patent is extended or adjusted under 35 U.S.C. 154(b) by 253 days.

(21) Appl. No.: 16/466,428

(22) PCT Filed: Jul. 25, 2017

(86) PCT No.: PCT/CN2017/094257
§ 371 (c)(1),
(2) Date: Jun. 4, 2019

(87) PCT Pub. No.: WO2018/120806
PCT Pub. Date: Jul. 5, 2018

(65) Prior Publication Data

US 2019/0312340 A1 Oct. 10, 2019

(30) Foreign Application Priority Data

Dec. 26, 2016 (CN) ........................ 201611219110.2

(51) Int. Cl.
*H01Q 1/24* (2006.01)
*H01Q 1/27* (2006.01)
(Continued)

(52) U.S. Cl.
CPC ............. *H01Q 1/273* (2013.01); *G04G 17/04* (2013.01); *H01Q 1/22* (2013.01); *H01Q 1/38* (2013.01); *H01Q 3/005* (2013.01)

(58) Field of Classification Search
CPC ............ H01Q 1/243; H01Q 1/50; H01Q 9/42; H01Q 7/00; H01Q 1/48; H01Q 5/328;
(Continued)

(56) References Cited

U.S. PATENT DOCUMENTS 10,271,299 B1 * 4/2019 Sayem .................. G04R 60/08
2012/0235868 A1 9/2012 Oshiro et al.
(Continued)

FOREIGN PATENT DOCUMENTS

CN 201804995 U 4/2011
CN 102122128 A 7/2011
(Continued)

OTHER PUBLICATIONS

International Search Report issued in PCT/CN2017/094257 dated Sep. 6, 2017.
(Continued)

*Primary Examiner* — Linh V Nguyen
(74) *Attorney, Agent, or Firm* — Fox Rothschild LLP; Carol E. Thorstad-Forsyth

(57) ABSTRACT

A wearable device comprises a body (1) and an outer casing (2) detachably mounted on the body (1). The body (1) is provided therein with a first printed circuit board (PCB) and a body antenna connected to each other, and the first PCB is provided thereon with a control circuit. The outer casing (2) is provided thereon with an outer casing antenna (201), and when the outer casing (2) and the body (1) are assembled, the outer casing antenna (201) is connected to the first PCB. The control circuit controls switching between the outer casing antenna (201) and the body antenna to use the outer casing antenna (201) or the body antenna as a working antenna. Also provided are an outer casing and a method for controlling an antenna of a wearable device.

10 Claims, 4 Drawing Sheets

(51) Int. Cl.

| | |
|---|---|
| ***H01Q 1/38*** | (2006.01) |
| ***H01Q 1/22*** | (2006.01) |
| ***G04G 17/04*** | (2006.01) |
| ***H01Q 3/00*** | (2006.01) |

(58) Field of Classification Search

CPC ........ H01Q 13/10; H01Q 9/0421; H01Q 1/44; H01Q 5/314; H01Q 5/371; H01Q 7/005; H01Q 23/00; H01Q 5/335; H01Q 1/242; H01Q 1/36; H01Q 5/35; H01Q 5/378; H01Q 9/14; H01Q 1/273; H01Q 1/52

USPC ........................................... 341/702, 700 MS

See application file for complete search history.

(56) References Cited

U.S. PATENT DOCUMENTS

| | | | | |
|---|---|---|---|---|
| 2016/0049721 | A1* | 2/2016 | Aizawa | G04G 21/04 343/718 |
| 2016/0308272 | A1* | 10/2016 | Standke | H01Q 13/10 |
| 2017/0040681 | A1* | 2/2017 | Fujisawa | H01Q 9/0407 |
| 2017/0170562 | A1* | 6/2017 | Lee | H01Q 9/14 |
| 2017/0365914 | A1* | 12/2017 | Hong | H04B 1/0064 |
| 2019/0058256 | A1* | 2/2019 | Sepanniitty | H01Q 7/00 |
| 2019/0245272 | A1* | 8/2019 | Varjonen | G01S 19/36 |
| 2020/0052370 | A1* | 2/2020 | Aizawa | G04G 21/04 |
| 2020/0243952 | A1* | 7/2020 | Zhu | G04R 60/02 |

FOREIGN PATENT DOCUMENTS

| | | | |
|---|---|---|---|
| CN | 201929233 | U | 8/2011 |
| CN | 202504471 | U | 10/2012 |
| CN | 203932307 | U | 11/2014 |
| CN | 204190759 | U | 3/2015 |
| CN | 104698819 | A | 6/2015 |
| CN | 105301953 | A | 2/2016 |
| CN | 105574457 | A | 5/2016 |
| CN | 105574458 | A | 5/2016 |
| CN | 105680156 | A | 6/2016 |
| CN | 106842896 | A | 6/2017 |
| CN | 206379467 | U | 8/2017 |
| WO | 2016085106 | A1 | 6/2016 |

OTHER PUBLICATIONS

First Office Action issued in Chinese Patent Application No. 201611219110.2 dated Oct. 8, 2021.

* cited by examiner

WEARABLE APPARATUS AND ANTENNA CONTROL METHOD THEREOF

CROSS REFERENCE TO RELATED APPLICATIONS

This application is a U.S. National Stage entry under 35 U.S.C. § 371 based on International Application No. PCT/CN2017/094257, filed on Jul. 25, 2017, which was published under PCT Article 21(2) and which claims priority to Chinese Patent Application No. 201611219110.2, filed on Dec. 26, 2016. The embodiment of the priority applications are hereby incorporated herein in their entirety by reference.

TECHNICAL FIELD

The present disclosure relates to the technical field of wearable devices, and more particularly to a wearable device and a method for controlling an antenna of a wearable device.

BACKGROUND

Wearable devices are developing toward increasingly smaller volumes. The size and structure of wearable devices, such as smart watches, are becoming smaller, but in the limited volume, multiple different antennas are needed to cover multiple different frequency bands to achieve different functions.

As a transducer, the antennas convert high-frequency electrical energy into electromagnetic waves when used as a transmitter, and convert electromagnetic waves into high-frequency electrical energy when used as a receiver. The design and installation of the antennas plays an important role in improving the quality of communication. Limited by the sizes and structures of the wearable devices, the performance of the antennas on the wearable devices is poor. For example, test results show that the efficiency of GPS (Global Positioning System) antennas of the currently mainstream smart watches is only about 5%, which seriously affects the user experience. It has become an urgent problem to be solved how to improve the performance of the antennas within the limited size of the wearable devices.

SUMMARY

The present disclosure provides a wearable device and a method for controlling an antenna of a wearable device to solve the problem that the antenna performance of the conventional wearable devices is bad and thus the user experience is poor.

According to an aspect of the present disclosure, a wearable device is provided, which comprises:

a body, and an outer casing detachably mounted on the body, wherein the body is provided therein with a first printed circuit board (PCB) and a body antenna connected to each other, and the first PCB is provided thereon with a control circuit, the outer casing is provided thereon with an outer casing antenna, and, when the outer casing and the body are assembled, the outer casing antenna is connected to the first PCB, and the control circuit controls switching between the outer casing antenna and the body antenna to use the outer casing antenna or the body antenna as a working antenna.

According to another aspect of the present disclosure, a wearable device is provided, which comprises a body, wherein the body is provided therein with a first printed circuit board (PCB) and a body antenna connected to each other, and the first PCB is provided thereon with a control circuit, the body is further provided thereon with a switching detection contact and an antenna contact, and the switching detection contact and the antenna contact are both connected to the control circuit, and, when the outer casing and the body are assembled, connected to a connector on a second PCB in an outer casing and an outer casing antenna of the outer casing, and the control circuit controls switching between the outer casing antenna and the body antenna to use the outer casing antenna or the body antenna as a working antenna.

According to still another aspect of the present disclosure, a method for controlling an antenna of a wearable device is provided, and the method comprises:

detecting whether a switching detection contact on an outer surface of a body of the wearable device is connected to a connector on an outer casing; wherein the connector is disposed on the outer casing and, when the body and the outer casing are assembled, capable of being connected to the switching detection contact, and when it is detected that the switching detection contact is connected to the connector, controlling the outer casing antenna on the outer casing to be switched on, and using the outer casing antenna as a working antenna of the wearable device; and when it is detected that the switching detection contact is not connected to the connector, controlling the body antenna on the body of the wearable device to be switched on, and using the body antenna as a working antenna of the wearable device.

The advantageous effects of the present disclosure are as follows. According to the wearable device of the present disclosure, the outer casing is detachably mounted on the body, the outer casing is provided thereon with an outer casing antenna, and the body is provided therein with the body antenna; and after the outer casing and the body are assembled, the switching between the outer casing antenna and the body antenna can be achieved to meet the requirements of different application scenarios, thereby obtaining the advantageous effects of improving the antenna performance of the wearable device and optimizing the user experience without increasing the body volume and size of the conventional wearable devices.

DETAILED DESCRIPTION

The inventive concept of the present disclosure is as follows. The conventional wearable devices have a tendency to be miniaturized, and their volume and size are smaller, which results in poor performance of the antenna in the wearable device and cannot meet the user's needs. With respect to that problem, the present disclosure proposes a wearable device comprising a body and an outer casing, and the body is provided therein with a body antenna. In other words, the present disclosure does not modify the volume of the body of the wearable device, but mount an outer casing on the body. The outer casing is provided thereon with an outer casing antenna. In an environment with a poor signal intensity such as indoors, the outer casing antenna can be switched as a working antenna to meet the user's requirements and improve the antenna performance of the wearable device.

For the sake of convenience, in the present disclosure, the smart watch is taken as an example to describe the structure of the wearable device. However, it can be understood that the application of the present disclosure is not limited to the smart watch, and it may also be applied to other smart wearable terminals that need an antenna to communicate, such as a smart wristband, smart glasses, etc.

First Embodiment

Figure 1:
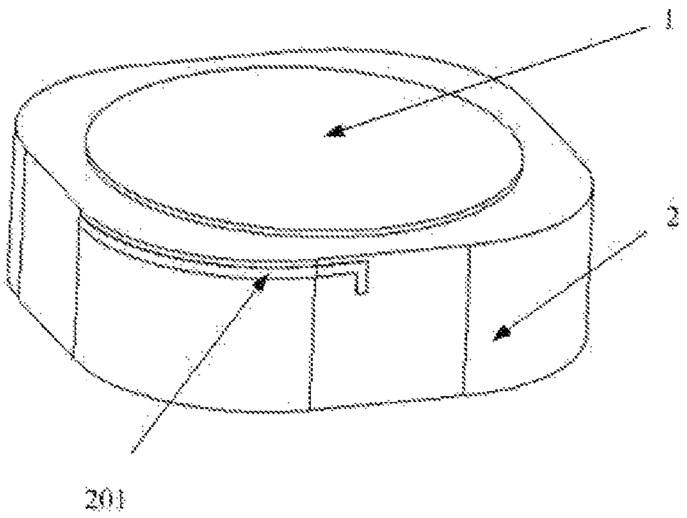
FIG. 1 is a schematic structural view of a wearable device according to an embodiment of the present disclosure.

FIG. 1 is a schematic structural view of a wearable device according to an embodiment of the present disclosure. As shown in FIG. 1, the wearable device comprises a body 1 and an outer casing 2 detachably mounted on the body 1.

The body 1 is provided therein with a first PCB (Printed Circuit Board) and a body antenna (not shown in FIG. 1) connected to each other, and the first PCB is provided thereon with a control circuit.

The outer casing 2 is provided thereon with an outer casing antenna 201, and, when the outer casing 2 and the body 1 are assembled, the outer casing antenna 201 is connected to the first PCB.

The control circuit (not shown in FIG. 1) controls switching between the outer casing antenna 201 and the body antenna to use the outer casing antenna 201 or the body antenna as a working antenna.

As shown in FIG. 1, the wearable device (for example, a smart watch) of the present embodiment comprises two parts: the body and the outer casing. The body is provided thereon with the first PCB and the body antenna connected to each other, and the outer casing is provided thereon with the outer casing antenna. The body and the outer casing are detachably assembled. In actual use, taking a GPS antenna as an example, when it is necessary to improve the positioning accuracy of the smart watch or in a place where the signal is weak due to being blocked by objects such as an urban area, the working antenna may be switched to the outer casing antenna to improve the antenna performance and enhance the user experience.

In addition, by adding the outer casing to the smart watch body, the performance of the antenna can be improved in a way without modifying the limited internal structure of the smart watch body, which caters to the trend of miniaturization of the smart watch. Moreover, by mounting the outer casing adaptable to the appearance of the smart watch, the smart watch becomes more diverse and charming.

Second Embodiment

The structure of the wearable device according to the present disclosure will be described in detail below with reference to FIGS. 2 to 7.

Figure 2:
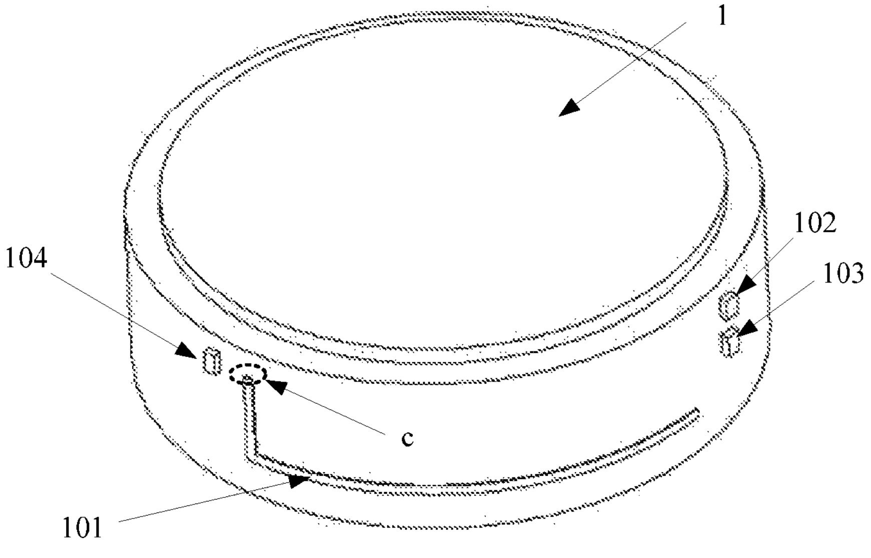
FIG. 2 is a schematic structural view of a body of a wearable device according to an embodiment of the present disclosure.

Referring to FIG. 2, the body 1 is provided thereon with a switching detection contact connected to a control terminal of the control circuit, which comprises a first switching detection contact 102 and a second switching detection contact 103.

Figure 3:
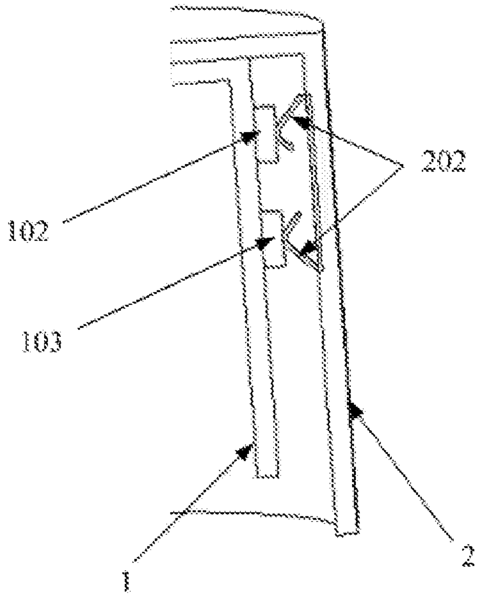
FIG. 3 is a partial schematic view showing the connection of switching detection contacts on a body of a wearable device with an outer casing according to an embodiment of the present disclosure.

Referring to FIG. 3, the outer casing 2 is provided thereon with a connector 202 connected to the first switching detection contact 102 and the second switching detection contact 103 when the outer casing 2 and the body 1 are assembled.

When the first switching detection contact 102 and the second switching detection contact 103 are both connected to the connector 202, the control circuit controls to switch on the outer casing antenna and uses the outer casing antenna as a working antenna.

Figure 5:
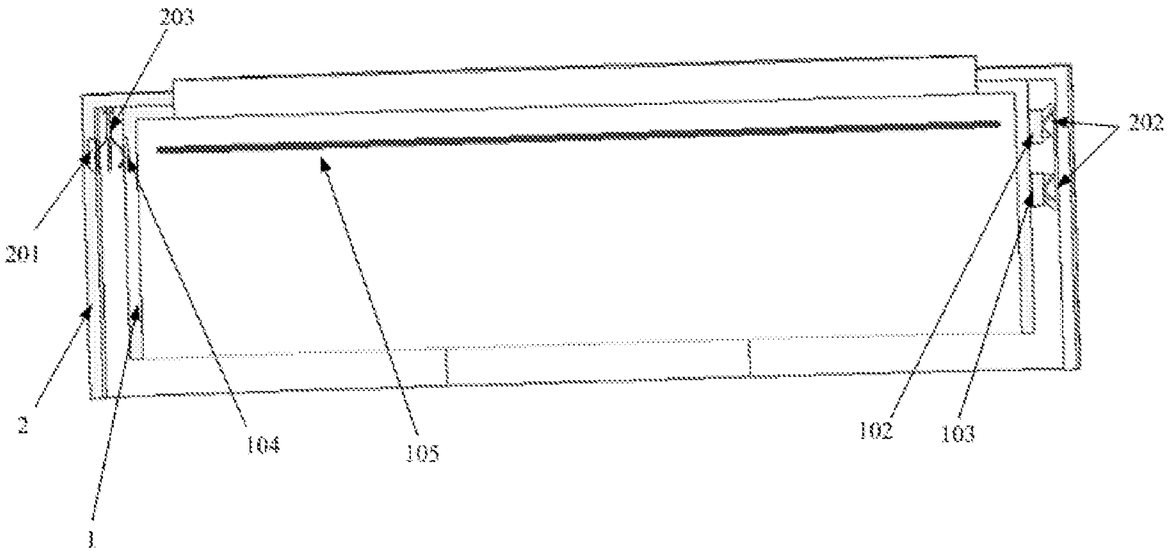
FIG. 5 is a cross-sectional view showing the connection of a body and an outer casing of a wearable device according to an embodiment of the present disclosure.
Figure 7:
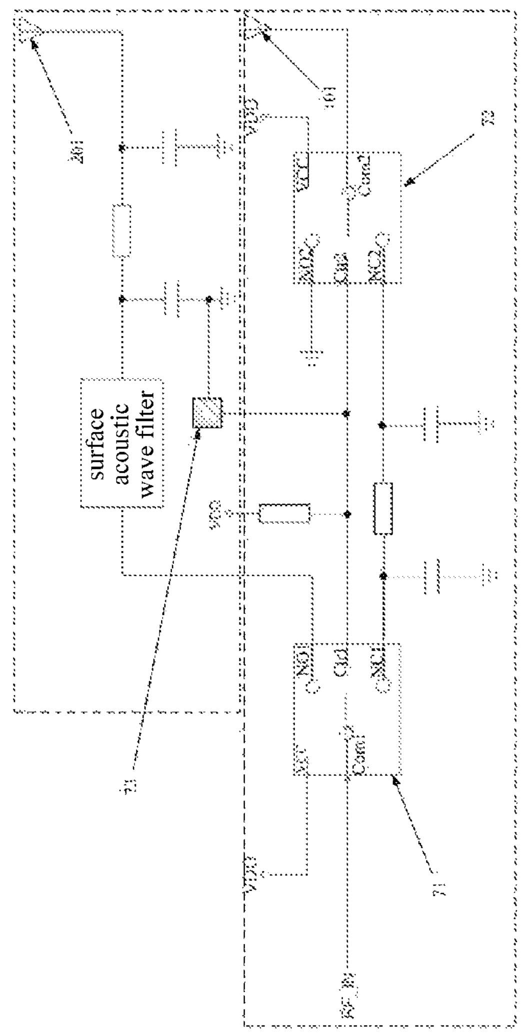
FIG. 7 is a circuit schematic diagram of a wearable device according to an embodiment of the present disclosure.

Referring to FIGS. 2, 5 and 7, the control circuit refers to the position corresponding to 73 in the circuit schematic diagram of FIG. 7. Correspondingly, the control circuit comprises: the first switching detection contact 102 and the second switching detection contact 103 shown in FIG. 2 and the connector 202 shown in FIG. 5. In an embodiment, when two switching detection contacts (i.e., the first switching detection contact 102 and the second switching detection contact 103) and the connector 202 on the outer casing 2 are connected, the control circuit forms a pathway. At this time, the control signals of the two switches are at a low level, and the outer casing antenna is used as a working antenna.

Figure 4:
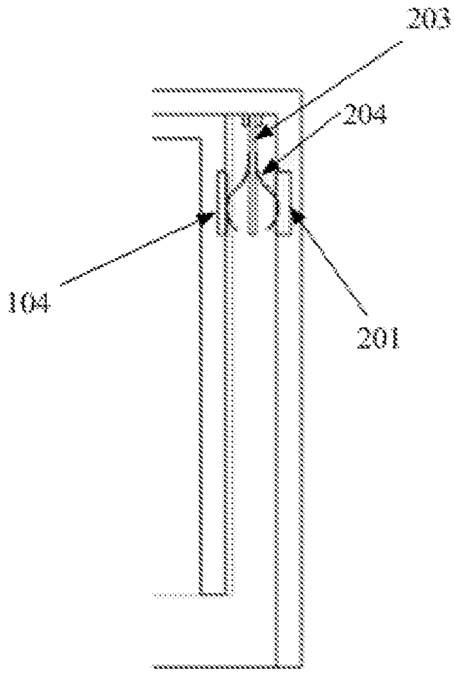
FIG. 4 is a partial schematic view showing the connection of an antenna contact on a body of a wearable device with an outer casing according to an embodiment of the present disclosure.

Referring to FIGS. 2, 4 and 5, the body 1 is further provided thereon with an antenna contact 104 connected to the first PCB (105 shown in FIG. 5), and the antenna contact 104 is connected to the outer casing antenna 201 when the outer casing 2 and the body 1 are assembled.

The first switching detection contact 102, the second switching detection contact 103 and the antenna contact 104 are all disposed on the outer surface of the body 1.

As shown in FIG. 2, the first switching detection contact 102 and the second switching detection contact 103 are disposed on one side of the outer surface of the body 1.

The antenna contact 104 is disposed on the other side of the outer surface of the body 1, and is spaced apart from the first switching detection contact 102 and the second switching detection contact 103 by a distance greater than or equal to a first predetermined distance threshold.

Here, the first predetermined distance threshold may be specifically set according to the volume and size of the smart watch. It should be emphasized that the purpose of providing the first predetermined distance threshold in the present embodiment is to ensure that the antenna contact 104 is spaced apart from the first switching detection contact 102 and the second switching detection contact 103 as far as possible, to avoid mutual interference between the antenna contact and the switching detection contacts and prevent the antenna performance from being affected.

In other words, in the present embodiment, the first switching detection contact 102 and the second switching detection contact 103 are disposed on one side of the outer surface of the body 1, and the antenna contact 104 is disposed on the other side of the outer surface of the body 1, thereby ensuring that the distance between the switching detection contacts and the antenna contact is far and reducing the mutual interference between them.

As described above, the number of switching detection contact is two, and the two switching detection contacts are the first switching detection contact 102 and the second switching detection contact 103. One end of the first switching detection contact 102 is connected to the power supply VDD, one end of the second switching detection contact 103 is connected to the ground GND. The connector 202, disposed on the outer casing 2 and connected to the first switching detection contact 102 and the second switching detection contact 103 when the outer casing 2 and the body 1 are assembled, is a first elastic member such as a spring piece.

In the present embodiment, the first switching detection contact 102 and the second switching detection contact 103 are provided, one end of the first switching detection contact 102 is connected to the power supply VDD, and one end of the second switching detection contact 103 is connected to the ground (GND). Therefore, after the outer casing and the body are assembled, the first elastic member (such as a spring piece) on the outer casing is connected to the first switching detection contact 102 and the second switching detection contact 103, and thus the first switching detection contact 102 and the second switching detection contact 103 are shorted.

In addition, in the present embodiment, two switching detection contacts are disposed on the body, and both of the two switching detection contacts are disposed on one side of the outer surface of the body, so the control circuit of the present embodiment has a more compact structure, which saves the limited space of the smart watch.

Referring to FIG. 4, a second PCB 203 is disposed in the outer casing 2, a second elastic member 204 (for example, a spring piece) is disposed on the second PCB 203, and the second elastic member 204 is connected to the outer casing antenna 201.

The second elastic member 204 (the number of the spring pieces illustrated in FIG. 4 is two, which are distributed on the left and right sides of the second PCB 203) is further connected to the antenna contact 104 of the body 1 when the outer casing 2 and the body 1 are assembled.

As shown in FIG. 7, the second PCB 203 is further provided thereon with a surface acoustic wave filter, which is connected to one of the first stationary contacts of the first switching element 71 and the outer casing antenna 201 when the outer casing 2 and the body 1 are assembled.

In the present embodiment, by adding an surface acoustic wave filter at the antenna entrance on the outer casing 2 (i.e., the position indicated by the antenna contact 104 of the body 1), the received signal is filtered and improved before being sent to the subsequent circuit for processing, so the receiving performance of the outer casing antenna can be greatly improved.

It should be noted that, for the body antenna, in the actual fabrication and design, a device for filtering the received signal of the antenna is usually provided on the first PCB inside the body, so the filtering of the body antenna will not be further described in the present embodiment.

FIG. 5 is a partial schematic view of the outer casing 2 and the body 1 after being assembled. As can be seen from FIG. 5, after the outer casing 2 is assembled with the body 1, on one side of the body 1, the first switching detection contact 102 and the second switching detection contact 103 reserved on the body 1 are connected to the connectors 202 reserved on the outer casing 2. The connector 202 here may be a spring piece. On the other side of the body 1, the left spring piece on the second PCB 203 of the outer casing 2 is connected to the outer casing antenna 201, the right spring piece is connected to the antenna contact 104 reserved on the body 1, and the antenna contact 104 is connected to the first PCB 105 in the body 1, so the outer casing antenna 201 is connected to the first PCB 105 of the body 1.

Referring to FIG. 7, the control circuit comprises: a first switching element 71 and a second switching element 72 that can be connected to the antenna signal source RF_IN.

The first switching element 71 controls the switching on/off of the outer casing antenna 201.

The second switching element 72 controls the switching on/off of the body antenna 101.

The switching detection contact 73 is connected to the control terminals on the first switching element 71 and the second switching element 72.

Here, it should be noted that the switching detection contact 73 is the first switching detection contact 102 and the second switching detection contact 103 shown in FIGS. 2 and 4, wherein one end of the first switching detection contact 102 is connected to the power supply VDD, and one end of the second switching detection contact 103 is connected to the ground (GND).

When the outer casing is not mounted on the body, i.e., when neither the first switching detection contact 102 nor the second switching detection contact 103 is connected to the connector 202 on the outer casing, the circuit between the first switching detection contact 102 and the second switching detection contact 103 is an open circuit. At this time, the body antenna 101 in the body works, and transmits and receives signals.

After the body and the outer casing are assembled, i.e., when the first switching detection contact 102 and the second switching detection contact 103 are both connected to the connector 202 (for example, a spring piece) on the outer casing, the circuit between the first switching detection contact 102, the second switching detection contact 103 and the connector 202 forms a pathway, so the outer casing antenna 201 on the outer casing works, and transmits and receives signals.

Referring to FIG. 7, it should be noted that in FIG. 7, the circuit part enclosed by the dotted line is disposed in the outer casing, and the remaining circuit part is disposed in the body. In the actual circuit design, the antenna contact (or antenna interface) and the switching detection contact are reserved on the body, the control circuit for controlling the antenna switching is designed on the first PCB 105 of the body, and at the same time, the corresponding connector is reserved on the outer casing, thereby obtaining the advantageous effect of switching to the outer casing antenna and using it as a working antenna when needed, and improving the performance of the smart watch antenna.

As shown in FIG. 7, the first switching element 71 comprises a first movable contact, two first stationary contacts and a first control terminal. The second switching element 72 comprises a second movable contact, two second stationary contacts and a second control terminal. The first control terminal of the first switching element 71 and the second control terminal of the second switching element 72 are connected to the switching detection contact 73. The first movable contact of the first switching element 71 is connected to the antenna signal source RF_IN. One of the first stationary contacts of the first switching element 71 is connected to the antenna contact capable of being connected to the outer casing antenna 201, and the other first stationary contact is connected to one of the second stationary contacts of the second switching element 72. The second movable contact of the second switching element 72 is connected to the body antenna 101, and the other second stationary contact of the second switching element 72 is grounded.

When the first movable contact of the first switching element 71 is connected to the first stationary contact that is connected to one of the second stationary contacts of the second switching element 72, and the second movable contact of the second switching element 72 is connected to the second stationary contact that is connected to one of the first stationary contacts of the first switching element 71, the body antenna 101 works. When the first movable contact of the first switching element 71 is connected to the first stationary contact that is connected to the antenna contact of the outer casing antenna 201, and the second movable contact of the second switching element 72 is connected to the grounded second stationary contact, the outer casing antenna 201 works.

It should be noted that, in the present embodiment, the two switching elements may have the same structure. As shown in FIG. 7, the two switching elements (the first switching element 71 and the second switching element 72) are single pole double throw switches, each of which comprises: a control terminal pin Ctr1, a movable contact pin Com and two stationary contact pins, i.e., a stationary contact pin NO and a stationary contact pin NC.

The first switching element 71 comprises a first movable contact Com1, a first stationary contact NO1, a first stationary contact NC1 and a first control terminal Ctr1. The second switching element 72 comprises a second movable contact Com2, a second stationary contact NO2, a second stationary contact NC2 and a second control terminal Ctr2.

The first control terminal Ctr1 of the first switching element 71 and the second control terminal Ctr2 of the second switching element 72 are connected to the switching detection contact. The first movable contact Com1 of the first switching element 71 is connected to the antenna signal source RF_IN, the first stationary contact NO1 of the first switching element 71 is connected to the antenna contact capable of being connected to the outer casing antenna, and the first stationary contact NC1 is connected to the second stationary contact NC2 of the second switching element 72. The second movable contact Com2 of the second switching element 72 is connected to the body antenna, and the second stationary contact NO2 of the second switching element 72 is grounded.

It should be noted that, the Com1, NO1, NC1, Ctr1, Com2, NO2, NC2 and Ctr2 may be understood as names here.

Specifically, the working process of the control circuit of the present embodiment is as follows. When the outer casing 2 is not mounted on the body 1, the switching detecting contact 73 is in an open circuit. At this time, the control signal is at a high level, two switching elements (the first switching element 71 and the second switching element 72) are turned on so that the body antenna 101 is switched on. In other words, when the smart watch works alone, the body antenna 101 inside the smart watch is switched on.

It should be noted that, in the present embodiment, in the circuit shown in FIG. 7, the control logic of the first switching element 71 is that, when the control signal is at a high level, the first movable contact Com1 is connected to the first stationary contact NC1, and when the control signal is at a low level, the first movable contact Com1 is connected to the first stationary contact NO1. The control logic of the second switching element 72 is that, when the control signal is at a high level, the second movable contact Com2 is connected to the second stationary contact NC2, and when the control signal is at a low level, the second movable contact Com2 is connected to the second stationary contact NO2.

After the outer casing 2 is mounted on the body 1, the first switching detection contact 102 and the second switching detection contact 103 are connected through a connector (spring piece) connecting to the outer casing antenna 201 on the outer casing, so that the circuit between the first switching detection contact 102 and the second switching detection contact 103 forms a pathway, and thus the control levels of the two switching switches 71, 72 are at a low level. At this time, through the switch selection, the body antenna 101 is grounded (the antenna 101 becomes an extended ground of the smart watch after being grounded), and the outer casing antenna 201 is switched on and used as a working antenna for signal transmission and reception.

Further, in the present embodiment, it is described that the movable contact of the first switching element 71 is connected to the antenna signal source RF_IN, and the reception and transmission of signals are performed by the antenna signal source RF_IN.

In general, antennas are reversible. In other words, the same antenna may be used as both a transmitting antenna and a receiving antenna. For the same antenna, the basic characteristic parameters for transmission or reception, such as polarization, directivity, effective length, and impedance characteristic, are the same. That is the reciprocity theorem of antennas. Therefore, in the present embodiment, the smart watch may complete the reception and transmission of antenna signals through the same outer casing antenna, or the smart watch may complete the reception and transmission of antenna signals through the same body antenna.

It should be emphasized that the special design of the antenna circuit structure of the present embodiment can significantly improve the antenna performance compared with the prior art in which only the antenna in the smart watch is used. That will be further illustrated below with reference to FIGS. 6 and 7.

Figure 6:
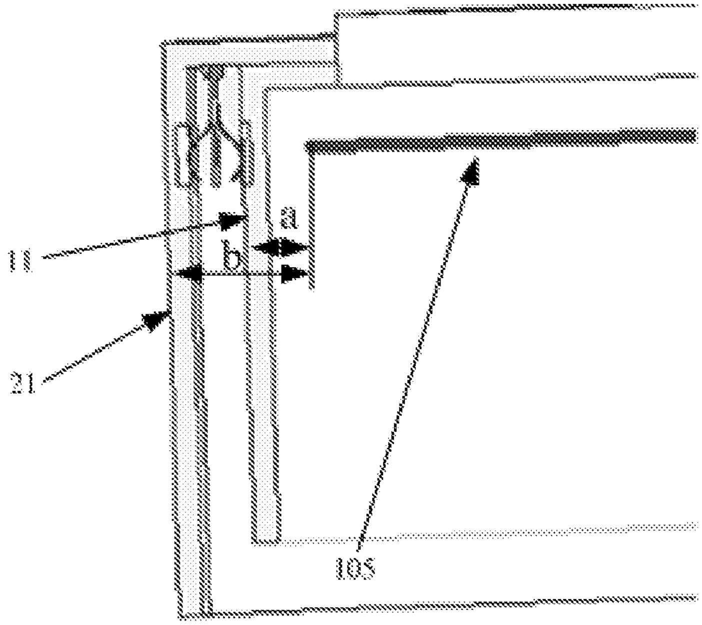
FIG. 6 is a partial schematic structural view of FIG. 5 according to an embodiment of the present disclosure.

Referring to FIG. 6, after the outer casing is mounted on the body, the spring piece of the second PCB of the outer casing which is connected to the outer casing antenna is in contact with the antenna contact on the body, and the antenna contact is connected to the first PCB 105 of the body. At this time, the control signals of the two switching elements are both at a low level. According to the above-described control logics of the switching element, under the control by the second switching element, the body antenna is grounded, and the outer casing antenna works.

In FIG. 6, the first PCB 105 is the main ground of the smart watch, 11 is the plane in which the body antenna 101 is located, and 21 is the plane in which the outer casing antenna 201 is located. As shown in FIG. 6, the effective clearance b of the outer casing antenna is larger than the effective clearance a of the body antenna, so the efficiency and bandwidth of the outer casing antenna are significantly improved.

In other words, in the present embodiment, the body antenna in the smart watch body is grounded when the outer casing antenna is switched on and works, so the length of the equivalent ground is extended, and the distance of the outer casing antenna from the effective ground is increased compared with the original body antenna in the smart watch body (experiment results indicate that the distance can be increased by more than 2 mm), which can improve the working frequency band and radiation efficiency of the outer casing antenna and improve the performance of the smart watch antenna.

Referring to FIG. 2, furthermore, in order to improve the input impedance and the antenna performance, in the present embodiment, the distance between the feeding point of the outer casing antenna 201 and the feeding point of the body antenna 101 (the position indicated by c) is less than or equal to a second predetermined distance threshold, and the wiring direction of a long side of the outer casing antenna (which can be seen in combination with the outer casing antenna shown in FIG. 1) is opposite to the wiring direction of a long side of the body antenna.

It should be noted that, in the present embodiment, the reason for setting a second predetermined distance threshold, and making the distance between the feeding point of the outer casing antenna 201 and the feeding point of the body antenna 101 less than or equal to the second predetermined distance threshold is in order to achieve the following advantageous effects that the distance between the two antenna feeding points is as small as possible, so in the circuit processing the impedance line to be processed of the radiofrequency receiving circuit is as short as possible, the impedance matching is easy to achieve, the difference and loss of the impedance line are easy to be reduced, and thus the antenna performance is improved.

In other words, the feeding point positions of the body antenna and the outer casing antenna should be as close as possible, and the distance between the wirings of the body antenna and the outer casing antenna should be as far as possible, thereby increasing the impedance characteristic of the ground, increasing the effective clearance of the outer casing antenna (because the body antenna acts as the ground when the outer casing antenna is working), and thus significantly increasing the outer casing antenna bandwidth.

It should be noted that, the feeding point here is the connection position of the antenna signal line and the feeder line (such as a coaxial cable), which is generally a solder joint.

As stated above, the smart watch of the present embodiment comprises the body and the outer casing. The body is provided therein with the first PCB and the body antenna. The body antenna is connected to the first PCB, which is also provided thereon with the control circuit. The control circuit can use the outer casing antenna on the outer casing as the working antenna of the wearable device after the outer casing and the body are assembled. Therefore, when the positioning accuracy of the smart watch needs to be improved or when the signal is weak due to obstructions in an urban area or the like, the performance of the antenna can be improved by adding a casing to the watch. After adding a casing to the watch body, the antenna in the watch body is grounded by switching, so that the whole ground of the smart watch is extended, thereby increasing the bandwidth of the outer casing antenna and improving the antenna performance.

In addition, since the body antenna is grounded when the outer casing antenna is switched on, the distance from the outer casing antenna to the ground of the smart watch is much larger than the distance from the body antenna to the ground, which increases the effective clearance of the outer casing antenna and improves the performance of the outer casing antenna.

The practical tests show that, after the outer casing is mounted and the smart watch is in the wearing mode, the efficiency of the antenna (such as the GPS antenna) is increased from 5% to 13%.

Third Embodiment

According to another aspect of the present disclosure, a wearable device is provided. The wearable device comprises a body. The body is provided therein with a first PCB and a body antenna connected to each other, and the first PCB is provided thereon with a control circuit, The body is further provided thereon with a switching detection contact and an antenna contact, and the switching detection contact and the antenna contact are both connected to the control circuit, and, when the outer casing and the body are assembled, connected to a connector on a second PCB in an outer casing and an outer casing antenna of the outer casing.

The control circuit controls switching between the outer casing antenna and the body antenna to use the outer casing antenna or the body antenna as a working antenna.

The wearable device of the present embodiment comprises the body, on which the switching detection contact and the antenna contact are reserved, thereby facilitating the assembling with the outer casing. Moreover, after the body is assembled with the outer casing, the outer casing antenna on the outer casing is used to transmit and receive signals, thereby improving the antenna performance of wearable devices and increasing user satisfaction.

Fourth Embodiment

According to still another aspect of the present disclosure, an outer casing is provided, which may be assembled with a body of a wearable device and comprises a second PCB and an outer casing antenna connected to each other. The second PCB is provided thereon with a connector that is connected to the switching detection contact on the body when the outer casing and the body are assembled.

When the connector is connected to the switching detection contact on the body and the outer casing antenna is connected to the antenna contact on the body, the outer casing antenna may be controlled to be a working antenna of the wearable device.

In the outer casing provided in the present embodiment, the connector capable of being connected to the switching detection contact and the antenna contact on the body is reserved, so that it can be connected to the first printed circuit board on the body after being assembled with the body to transmit and receive antenna signals, and the antenna performance of the wearable device is improved.

Fifth Embodiment

The present embodiment provides a method for controlling an antenna of a wearable device, and the method comprises:

detecting whether a switching detection contact on an outer surface of a body of the wearable device is connected to a connector on an outer casing; wherein the connector is disposed on the outer casing and, when the body and the outer casing are assembled, capable of being connected to the switching detection contact, and when it is detected that the switching detection contact is connected to the connector, controlling the outer casing antenna on the outer casing to be switched on, and using the outer casing antenna as a working antenna of the wearable device; when it is detected that the switching detection contact is not connected to the connector, controlling the body antenna on the body of the wearable device to be switched on, and using the body antenna as a working antenna of the wearable device.

In an embodiment of the present disclosure, the step of detecting whether a switching detection contact on an outer surface of a body of the wearable device is connected to a connector on an outer casing comprises:

providing a first switching element and a second switching element on a first PCB of the body of the wearable device, wherein both the first switching element and the second switching element are connected to an antenna signal source; and connecting a control terminal of the first switching element and a control terminal of the second switching element to the switching detection contact; and the step of when it is detected that the switching detection contact is connected to the connector, controlling the outer casing antenna on the outer casing to be switched on, and using the outer casing antenna as a working antenna of the wearable device; when it is detected that the switching detection contact is not connected to the connector, controlling the body antenna on the body of the wearable device to be switched on, and using the body antenna as a working antenna of the wearable device comprises:

connecting a first movable contact of the first switching element to the antenna signal source, connecting one of first stationary contacts of the first switching element to an antenna contact capable of being connected to the outer casing antenna, and connecting another first stationary contact to one of second stationary contacts of the second switching element;

connecting a second movable contact of the second switching element to the body antenna, and grounding another second stationary contact of the second switching element;

when the first movable contact of the first switching element is connected to the first stationary contact that is connected to the one of second stationary contacts of the second switching element, and the second movable contact of the second switching element is connected to the second stationary contact that is connected to the one of first stationary contacts of the first switching element, making the body antenna work; and when the first movable contact of the first switching element is connected to the first stationary contact that is connected to the antenna contact of the outer casing antenna, and the second movable contact of the second switching element is connected to the grounded second stationary contact, making the outer casing antenna work.

It should be noted that the method for controlling an antenna of a wearable device of the present embodiment is implemented based on the structure of the wearable device in the first embodiment, and the method for controlling an antenna of a wearable device corresponds to the working process of the wearable device in the first embodiment. Therefore, more details about the method for controlling an antenna of a wearable device may refer to the foregoing embodiments, and are not repeated here.

In sum, the wearable device and the method for controlling an antenna of a wearable device according to the present disclosure, by mounting the outer casing on the body and controlling the body antenna and the outer casing antenna of the body to be switched as the working antenna to transmit and receive the signal by using the control circuit of the body, can meet the user's needs in different scenarios and optimize the user experience.

In addition, by grounding the body antenna in the body when the outer casing antenna works, the length of the ground is equivalently extended, which increases the bandwidth acquired by the outer casing antenna, improves the efficiency and bandwidth of the outer casing antenna, enhances the antenna performance of the wearable device, and increases the market competitiveness of the wearable device.

The above is only specific embodiments of the present disclosure, and other improvements or modifications may be made by those skilled in the art based on the above teachings of the present disclosure. It should be understood by those skilled in the art that the above specific description is only for better explaining the present disclosure, and the protection scope of the present disclosure should be determined by the protection scope of the claims.

What is claimed is:

1. A wearable device, comprising:

a body, and an outer casing detachably mounted on the body, wherein the body is provided therein with a first printed circuit board (PCB) and a body antenna connected to each other, and the first PCB is provided thereon with a control circuit, the outer casing is provided thereon with an outer casing antenna, and, when the outer casing and the body are assembled, the outer casing antenna is connected to the first PCB, the control circuit controls switching between the outer casing antenna and the body antenna to use the outer casing antenna or the body antenna as a working antenna, a distance between a feeding point of the outer casing antenna and a feeding point of the body antenna is less than or equal to a second predetermined distance threshold, a wiring direction of a long side of the outer casing antenna is opposite to a wiring direction of a long side of the body antenna, and the wearable device is a smart wristband device.

2. The wearable device according to claim 1, wherein the body is provided thereon with a switching detection contact connected to a control terminal of the control circuit, the outer casing is provided thereon with a connector that is connected to the switching detection contact when the outer casing and the body are assembled, and when the switching detection contact is connected to the connector, the control circuit controls to switch on the outer casing antenna and use the outer casing antenna as a working antenna.

3. The wearable device according to claim 2, wherein the body is further provided thereon with an antenna contact connected to the first PCB, and the antenna contact is connected to the outer casing antenna when the outer casing and the body are assembled, the switching detection contact and the antenna contact are both disposed on an outer surface of the body, the switching detection contact is disposed on one side of the outer surface of the body, the antenna contact is disposed on the other side of the outer surface of the body, and the distance between the switching detection contact and the antenna contact is greater than or equal to a first predetermined distance threshold.

4. The wearable device according to claim 3, wherein the control circuit comprises: a first switching element and a second switching element that are capable of being connected to an antenna signal source;

the first switching element controls switching on/off of the outer casing antenna;

the second switching element controls switching on/off of the body antenna; and the switching detection contact is connected to control terminals on the first switching element and the second switching element.

5. The wearable device according to claim 4, wherein the first switching element comprises a first movable contact Com1, a first stationary contact NO1, a first stationary contact NC1 and a first control terminal Ctr1, the second switching element comprises a second movable contact Com2, a second stationary contact NO2, a second stationary contact NC2 and a second control terminal Ctr2, the first control terminal Ctr1 of the first switching element and the second control terminal Ctr2 of the second switching element are connected to the switching detection contact, the first movable contact Com1 of the first switching element is connected to the antenna signal source, the first stationary contact NO1 of the first switching element is connected to the antenna contact capable of being connected to the outer casing antenna, and the first stationary contact NC1 is connected to the second stationary contact NC2 of the second switching element, and the second movable contact Com2 of the second switching element is connected to the body antenna, and the second stationary contact NO2 of the second switching element is grounded;

when the first movable contact Com1 of the first switching element is connected to the first stationary contact NC1 that is connected to the second stationary contact NC2 of the second switching element, and the second movable contact Com2 of the second switching element is connected to the second stationary contact NC2 that is connected to the first stationary contact NC1 of the first switching element, the body antenna works; and when the first movable contact Com1 of the first switching element is connected to the first stationary contact NO1 that is connected to the antenna contact of the outer casing antenna, and the second movable contact Com2 of the second switching element is connected to the grounded second stationary contact NO2, the outer casing antenna works.

6. The wearable device according to claim 3, wherein the number of the switching detection contact is two, which are a first switching detection contact and a second switching detection contact, wherein one end of the first switching detection contact is connected to a power supply, and one end of the second switching detection contact is grounded, the connector, disposed on the outer casing and connected to the first switching detection contact and the second switching detection contact when the outer casing and the body are assembled, is a first elastic member; and the first elastic member is connected to the first switching detection contact and the second switching detection contact when the outer casing and the body are assembled, so that the first switching detection contact and the second switching detection contact are connected.

7. The wearable device according to claim 6, wherein the outer casing is provided therein with a second PCB, the second PCB is provided thereon with a second elastic member, and the second elastic member is connected to the outer casing antenna, the second elastic member is further connected to the antenna contact when the outer casing and the body are assembled; and the second PCB is further provided thereon with a surface acoustic wave filter, and the surface acoustic wave filter is connected to one of the first stationary contacts of the first switching element and the outer casing antenna when the outer casing and the body are assembled.

8. A wearable device, comprising a body, wherein the body is provided therein with a first printed circuit board (PCB) and a body antenna connected to each other, and the first PCB is provided thereon with a control circuit, the body is further provided thereon with a switching detection contact and an antenna contact, and the switching detection contact and the antenna contact are both connected to the control circuit, and, when the outer casing and the body are assembled, connected to a connector on a second PCB in an outer casing and an outer casing antenna of the outer casing, the control circuit controls switching between the outer casing antenna and the body antenna to use the outer casing antenna or the body antenna as a working antenna, a distance between a feeding point of the outer casing antenna and a feeding point of the body antenna is less than or equal to a second predetermined distance threshold, a wiring direction of a long side of the outer casing antenna is opposite to a wiring direction of a long side of the body antenna, and the wearable device is a smart wristband device.

9. A method for controlling an antenna of a wearable device, comprising:

detecting whether a switching detection contact on an outer surface of a body of the wearable device is connected to a connector on an outer casing; wherein the connector is disposed on the outer casing and, when the body and the outer casing are assembled, capable of being connected to the switching detection contact, and when it is detected that the switching detection contact is connected to the connector, controlling the outer casing antenna on the outer casing to be switched on, and using the outer casing antenna as a working antenna of the wearable device; and when it is detected that the switching detection contact is not connected to the connector, controlling the body antenna on the body of the wearable device to be switched on, and using the body antenna as a working antenna of the wearable device, wherein, a distance between a feeding point of the outer casing antenna and a feeding point of the body antenna is less than or equal to a second predetermined distance threshold, a wiring direction of a long side of the outer casing antenna is opposite to a wiring direction of a long side of the body antenna, and the wearable device is a smart wristband device.

10. The method for controlling an antenna according to claim 9, wherein the step of detecting whether a switching detection contact on an outer surface of a body of the wearable device is connected to a connector on an outer casing comprises:

providing a first switching element and a second switching element on a first printed circuit board (PCB) of the body of the wearable device, wherein both the first switching element and the second switching element are connected to an antenna signal source; and connecting a control terminal of the first switching element and a control terminal of the second switching element to the switching detection contact; and the step of when it is detected that the switching detection contact is connected to the connector, controlling the outer casing antenna on the outer casing to be switched on, and using the outer casing antenna as a working antenna of the wearable device; when it is detected that the switching detection contact is not connected to the connector, controlling the body antenna on the body of the wearable device to be switched on, and using the body antenna as a working antenna of the wearable device comprises:

connecting a first movable contact of the first switching element to the antenna signal source, connecting one of first stationary contacts of the first switching element to an antenna contact capable of being connected to the outer casing antenna, and connecting another first stationary contact to one of second stationary contacts of the second switching element;

connecting a second movable contact of the second switching element to the body antenna, and grounding another second stationary contact of the second switching element;

when the first movable contact of the first switching element is connected to the first stationary contact that is connected to the one of second stationary contacts of the second switching element, and the second movable contact of the second switching element is connected to the second stationary contact that is connected to the one of first stationary contacts of the first switching element, making the body antenna work; and when the first movable contact of the first switching element is connected to the first stationary contact that is connected to the antenna contact of the outer casing antenna, and the second movable contact of the second switching element is connected to the grounded second stationary contact, making the outer casing antenna work.

* * * * *